US012778005B2

(12) United States Patent
Berry

(10) Patent No.: US 12,778,005 B2
(45) Date of Patent: Nov. 3, 2026

(54) CHAFF FEED STREAM CONDITIONING SYSTEM

(71) Applicant: Seed Terminator Holdings Pty Ltd, Kingscote (AU)

(72) Inventor: Nicholas Kane Berry, Kingscote (AU)

(73) Assignee: Seed Terminator Holdings Pty Ltd, Kingscote (AU)

( * ) Notice: Subject to any disclaimer, the term of this patent is extended or adjusted under 35 U.S.C. 154(b) by 940 days.

(21) Appl. No.: 17/616,826

(22) PCT Filed: Mar. 9, 2020

(86) PCT No.: PCT/AU2020/050222

§ 371 (c)(1),
(2) Date: Dec. 6, 2021

(87) PCT Pub. No.: WO2020/176953

PCT Pub. Date: Sep. 10, 2020

(65) Prior Publication Data

US 2022/0287236 A1 Sep. 15, 2022

(30) Foreign Application Priority Data

Mar. 7, 2019 (AU) ................................ 2019900765

(51) Int. Cl.
*A01D 41/12* (2006.01)
*A01D 75/18* (2006.01)
(Continued)

(52) U.S. Cl.
CPC ....... *A01D 41/1243* (2013.01); *A01D 75/187* (2013.01); *A01F 12/32* (2013.01); *A01F 12/385* (2013.01)

(58) Field of Classification Search
CPC .. A01D 41/1243; A01D 75/187; A01D 12/32; A01D 12/385; A01F 12/32; A01F 12/385
See application file for complete search history.

(56) References Cited

U.S. PATENT DOCUMENTS 5,630 A * 6/1848 Snyder .................. A01F 12/446 209/318
286,930 A * 10/1883 Huber ..................... A01F 12/44 460/90
(Continued)

FOREIGN PATENT DOCUMENTS

AU 2018208622 A1 8/2018
CN 205408662 U 8/2016
(Continued)

OTHER PUBLICATIONS

DE 2447078 A—English translation (Year: 1976).*
(Continued)

*Primary Examiner* — Christopher J Sebesta
*Assistant Examiner* — Julia C Tran
(74) *Attorney, Agent, or Firm* — Michael Best & Friedrich LLP

(57) ABSTRACT

A chaff feed stream conditioning system 40 for installation in a combine having a crop residue handling system 10 that operates to separate crop residue into a straw feed stream 20 and a chaff feed stream 28 which may include weed seeds. The straw feed stream 20 is directed to flow towards a straw spreader or chopper 22 or is windrowed. The chaff feed stream 28 is directed to flow toward a mechanical devitalisation system 30 or other processor. The chaff feed stream conditioning system 40 comprises one or more components or devices such as a separator mechanism 42 and/or magnets M1-M3, distributed from an upstream end of the crop residue handling system through to a downstream end of the chaff feed stream 28 and configured to impede straw or other foreign matter from getting into the flow of chaff feed stream or otherwise reaching a downstream end of the chaff feed stream.

10 Claims, 7 Drawing Sheets

(51) Int. Cl.
*A01F 12/32* (2006.01)
*A01F 12/385* (2006.01)

(56) References Cited

U.S. PATENT DOCUMENTS

| | | | | | |
|---|---|---|---|---|---|
| 367,750 | A * | 8/1887 | Flagg | A01F 12/446 | 460/91 |
| 912,610 | A * | 2/1909 | Peterson | A01F 12/00 | 460/86 |
| 1,147,911 | A * | 7/1915 | Zieber | A01F 12/00 | 460/96 |
| 1,290,610 | A * | 1/1919 | Luedke | A01F 12/52 | 460/13 |
| 1,405,766 | A * | 2/1922 | Downing | A01F 12/44 | 460/83 |
| 2,500,448 | A * | 3/1950 | Bozarth | A01D 75/282 | 209/416 |
| 3,084,495 | A * | 4/1963 | Blackerby | A01D 75/20 | 56/320.1 |
| 3,593,719 | A * | 7/1971 | Ashton | A01F 12/00 | 460/73 |
| 3,603,063 | A * | 9/1971 | Stroburg | A01F 12/444 | 460/109 |
| 3,757,797 | A * | 9/1973 | Mathews | B07B 1/42 | 460/13 |
| 4,250,897 | A * | 2/1981 | Glaser | A01F 12/444 | 416/85 |
| 4,253,471 | A * | 3/1981 | Klimmer | A01F 12/44 | 460/92 |
| 4,257,215 | A * | 3/1981 | Maher | A01D 84/00 | 56/14.4 |
| 4,617,942 | A | 10/1986 | Garner | | |
| 7,654,478 | B1 * | 2/2010 | Lehmann | E01H 1/106 | 241/78 |
| 7,927,199 | B2 * | 4/2011 | Adamson | A01F 12/448 | 460/101 |
| 2005/0101363 | A1 * | 5/2005 | Farley | A01D 41/1243 | 460/112 |
| 2007/0256403 | A1 | 11/2007 | Teroerde et al. | | |
| 2014/0141848 | A1 * | 5/2014 | Farley | A01F 12/00 | 460/59 |
| 2016/0088794 | A1 * | 3/2016 | Baumgarten | A01D 41/127 | 460/1 |
| 2018/0070534 | A1 * | 3/2018 | Mayerle | A01F 12/40 | |
| 2018/0288940 | A1 | 10/2018 | Meschke et al. | | |
| 2018/0368319 | A1 * | 12/2018 | Desmet | A01F 17/02 | |
| 2019/0018378 | A1 * | 1/2019 | Varikooty | H04W 4/38 | |
| 2020/0196525 | A1 * | 6/2020 | Desmet | A01F 12/40 | |
| 2020/0236850 | A1 * | 7/2020 | Mayerle | A01D 41/14 | |

FOREIGN PATENT DOCUMENTS

| | | | | |
|---|---|---|---|---|
| DE | 2447078 | A * | 4/1976 | A01D 5/187 |
| GB | 189610941 | A | 4/1897 | |
| GB | 190405047 | A | 2/1905 | |
| KR | 20100043381 | A | 4/2010 | |
| RU | 2663330 | C1 | 8/2018 | |
| WO | 2018224510 | A1 | 12/2018 | |

OTHER PUBLICATIONS

Extended European Search Report for Application No. 20767369.0 dated May 26, 2023 (6 pages).

International Search Report and Written Opinion for Application No. PCT/AU2020/050222 dated May 11, 2020 (10 pages).

International Preliminary Report on Patentability for Application No. PCT/AU2020/05022 dated Aug. 25, 2021 (6 pages).

* cited by examiner

CHAFF FEED STREAM CONDITIONING SYSTEM

TECHNICAL FIELD

A chaff feed stream conditioning system is disclosed. Embodiments of the disclosed system may be incorporated in a combine harvester.

BACKGROUND ART

There has been renewed interest in mechanically destroying weed seeds on a combine harvester in recent times. Herbicide resistant weeds have evolved which make controlling weeds more difficult. Mechanically destroying seeds interrupts the lifecycle of the weeds facilitating the control of weed and volunteer before the next season as well as helping to prevent propagation of herbicide resistant weeds.

The modern combine harvester has three main material streams. Clean grain stream, straw material stream, and chaff material stream. Straw material includes the stems of crop and weeds and other components that pass through the combine without passing through concave or separator grates. The chaff material includes broken up stems, leaves, and other components that surround the grain or weed seeds. The chaff and grain pass through a threshing or separating system onto a cleaning system. The cleaning system include fans or blowers that generate substantial air flow needed to separate the grain from the chaff. The grain passes through the cleaning system into a grain tank. Chaff exits a cleaning shoe into a residue handling solution. Straw exits the separating system into a residue handling solution. The straw and chaff material are ordinarily returned to the soil surface. Often the straw material is chopped and spread. The chaff may be spread separately or with the straw material.

Some combines completely separate the chaff and straw material through the combine harvester. Other machines have an overlap between the chaff and straw systems, relying on a beater or chopper to throw the straw material past the end of the cleaning system. In combines where there is an overlap, there is an opportunity for straw material to land short. This occurs more often if the material has a high moisture content and is long and tough. Ordinarily this is not a major problem. But at times, it may cause false readings on shoe grain loss monitors.

In situations where the chaff needs to be relatively pure of straw material or other foreign material, relying on a beater or chopper can be problematic. Such situations include but are not limited to: where the chaff is intended to be used for: biomass energy; animal feed; capture of weed seeds; or capture and termination of weed seeds.

Sometimes a separator baffle is used to provide partial separation of the straw from the chaff. Complete separation is not practical as it provides nowhere for the air to escape from the harvester sieve, impeding the cleaning operation of the harvester's sieve.

SUMMARY OF THE DISCLOSURE

The general and broad idea of the present disclosure is to provide a chaff feed stream conditioning system and method which optimises the chaff stream for an intended use such as biomass energy; animal feed; capture of weed seeds; or capture and termination of weed seeds. The chaff feed stream conditioning system seeks to minimise the amount of non-chaff material such as for example straw, twigs, stones, and metallic material in the chaff stream prior to downstream processing. For ease of description the downstream processing exemplified in the following description is that of mechanical weed seed devitalisation.

In one aspect there is disclosed a chaff feed stream conditioning system for installation in a combine having a crop residue handling system that operates to separate crop residue into a straw feed stream and a chaff feed stream which may include weed seeds, where the straw feed stream is directed to flow towards a straw spreader or chopper or is windrowed and the chaff feed stream directed to flow toward a mechanical devitalisation system or other processor, the chaff feed stream conditioning system comprising: one or more components or devices distributed from an upstream end of the straw stream through to a downstream end of the chaff feed stream and configured to impede straw or other foreign matter from getting into the flow of chaff feed stream or otherwise reaching a downstream end of the chaff feed stream.

In one embodiment the one or more components or devices may comprise:

- one or more magnets located at one more points along straw or chaff feed streams and/or upstream of crop residue handling system to capture at least some metallic matter entrained in the crop residue and thereby reduce an amount of metallic matter in at least the chaff feed stream.

In one embodiment the one or more magnets includes a magnet upstream of crop residue handling system.

In one embodiment the one or more magnets includes a magnet along the straw feed stream.

In one embodiment the one or more magnets includes a magnet along the chaff feed stream.

In one embodiment the magnet along with the chaff feed stream is located adjacent an entry point of the mechanical devitalisation system or other processor.

In one embodiment the one or more magnets are provided in one or more magnetic trays.

In one embodiment the one or more components or devices may comprise a separation mechanism located between the straw feed stream and the chaff feed stream, the separation mechanism configured to impede material from the straw feed stream from entering the chaff feed stream or otherwise reaching a downstream end of the chaff feed stream.

In one embodiment the one or more components or devices further comprise a separation mechanism located between the straw feed stream and the chaff feed stream, the separation mechanism configured to impede material from the straw feed stream from entering the chaff feed stream.

In one embodiment the separation mechanism is operable to impart kinetic energy or motion to straw falling onto the separation mechanism wherein the straw is induced to move toward the straw spreader.

In one embodiment the separation mechanism is orientated to facilitate a gravitational feed of straw toward the straw spreader.

In one embodiment the separation mechanism comprises a support structure extending straw feed stream and the chaff feed stream.

In one embodiment the support structure is formed with a plurality of openings through which air is able to flow from below the separation mechanism to above the separation system.

In one embodiment the support structure comprises a platform.

In one embodiment the support structure comprises a conveyor belt.

In one embodiment the support structure comprises a louver structure having at least two or more overlapping and spaced apart surfaces, and wherein the air flow system includes a space between the two or more overlapping surfaces.

In one embodiment at least one of the magnets may be incorporated in or on or supported by the separator mechanism.

In one embodiment the chaff feed stream conditioning system comprises an air flow system capable of facilitating a flow of air: (a) through the separation mechanism; or (b) that bypasses the separation mechanism; or (c) having a first portion that flows through the separation mechanism and a second portion that bypasses the separation mechanism; or (d) both above and below the separation mechanism.

In one embodiment the separation mechanism may be magnetic or magnetisable or supports one or more magnets.

In one embodiment the chaff feed stream conditioning system comprises a baffle movable between: a first position in which the baffle directs the chaff feed stream into the mechanical devitalisation system, and the straw feed stream into the straw spreader or chopper; and a second position in which the baffle directs the chaff feed stream to bypass the mechanical devitalisation system and flow into the straw spreader or chopper.

In a second aspect there is disclosed chaff feed stream conditioning system for installation in a combine having a crop residue handling system that operates to separate crop residue into a straw feed stream and a chaff feed stream which may include weed seeds, where the straw feed stream is directed to flow towards a straw spreader or chopper and the chaff feed stream directed to flow toward a mechanical devitalisation system or other processor, the feed stream conditioning system comprising:

- a separation mechanism located between the straw feed stream and the chaff feed stream, the separation mechanism configured to impede material from the straw feed stream from entering the chaff feed stream or otherwise reaching a downstream end of the chaff feed stream; and
- one or more magnets located at one more points along straw or chaff feed streams and/or upstream of crop residue handling system to capture at least some metallic matter entrained in the crop residue and thereby reduce an amount of metallic matter in at least the chaff feed stream or otherwise reaching a downstream end of the chaff feed stream.

In one embodiment the separation mechanism is operable to impart kinetic energy or motion to straw falling onto the separation mechanism wherein the straw is induced to move toward the straw spreader.

In one embodiment the separation mechanism is orientated to facilitate a gravitational feed of straw toward the straw spreader.

In one embodiment the separation mechanism comprises a support structure extending straw feed stream and the chaff feed stream.

In one embodiment the support structure is formed with a plurality of openings through which air is able to flow from below the separation mechanism to above the separation system.

In one embodiment the support structure comprises a platform.

In one embodiment the support structure comprises a conveyor belt.

In one embodiment the support structure comprises a louver structure having at least two or more overlapping and spaced apart surfaces, and wherein the air flow system includes a space between the two or more overlapping surfaces.

In one embodiment the chaff feed stream conditioning system comprises an air flow system capable of facilitating a flow of air: (a) through the separation mechanism; or (b) that bypasses the separation mechanism; or (c) having a first portion that flows through the separation mechanism and a second portion that bypasses the separation mechanism; or (d) both above and below the separation mechanism.

In one embodiment chaff feed stream conditioning system comprises a baffle movable between: a first position in which the baffle directs the chaff feed stream into the mechanical devitalisation system, and the straw feed stream into the straw spreader or chopper; and a second position in which the baffle directs the chaff feed stream to bypass the mechanical devitalisation system and flow into the straw spreader or chopper.

In a third aspect there is disclosed a chaff feed stream conditioning system comprising:

- a straw handling mechanism having an upstream end and arranged to project straw contained in crop residue toward a straw spreader;
- a chaff handling mechanism for handling chaff in crop residue, the chaff handling mechanism having a downstream end;
- the straw handling mechanism located above the chaff handling mechanism with the downstream end of the straw handling mechanism being upstream of the downstream end of the chaff handling mechanism;
- a separation system located between the upstream end of the straw handling mechanism and the downstream end of the chaff handling mechanism, the separation mechanism configured to impede straw projected by the straw handling mechanism from entering the flow of chaff; and
- an air flow system capable of facilitating a flow of air: (a) through the separation mechanism; or (b) that bypasses the separation mechanism; or (c) having a first portion that flows through the separation mechanism and a second portion that bypasses the separation mechanism.

In one embodiment of the third aspect the separation mechanism extends over and beyond the downstream end of the chaff handling mechanism.

In one embodiment the air flow system is arranged to enable air to flow through the separation mechanism in a direction from below the separation mechanism to above the separation mechanism.

In one embodiment air flow system comprises one or more ducts having an opening between the flow of chaff and the separation mechanism to enable air to bypass the separation mechanism.

In one embodiment the air flow system is arranged to control air flow through the separation mechanism.

In one embodiment the separation mechanism is operable to impart kinetic energy or motion to straw falling onto the separation mechanism wherein the straw is induced to move toward the straw spreader.

In one embodiment the separation mechanism is orientated to facilitate a gravitational feed of straw toward the straw spreader.

In one embodiment the separation mechanism comprises a support structure extending between the upstream end of the straw handling system and the downstream end of the chaff handling system.

In one embodiment the support structure is formed with a plurality of openings through which air is able to flow from below the separation mechanism to above the separation system.

In one embodiment the support structure is declined in the downstream direction to facilitate gravitational feed of straw toward the straw spreader.

In one embodiment the support structure comprises a platform.

In one embodiment the support structure comprises a conveyor belt.

In one embodiment the support structure comprises a louver structure having at least two or more overlapping and spaced apart surfaces, and wherein the air flow system includes a space between the two or more overlapping surfaces.

In one embodiment chaff feed stream conditioning system comprises a control system enabling a user to separately and selectively control the air flow system and a degree of kinetic energy or motion imparted to the straw.

In a fourth aspect there is disclosed a chaff feed stream conditioning system comprising:

- a straw handling mechanism having an upstream end and arranged to project straw toward a straw spreader;
- a chaff handling mechanism having a downstream end;
- wherein the straw handling mechanism is located above the chaff handling mechanism with the upstream end of the straw handling mechanism being downstream of the upstream end of the chaff for handling mechanism; and
- wherein a separation mechanism is located between the straw handling mechanism and the chaff handling mechanism.

In one embodiment of all aspects the chaff feed stream conditioning system comprises an apparatus arranged to shake or vibrate the support structure.

In one embodiment chaff feed stream conditioning system comprises a baffle selectively movable between a first position providing a physical barrier between preventing a flow of chaff from the chaff handling mechanism into the straw spreader, and a second position enabling chaff from the chaff handling mechanism to be directed into the straw spreader.

In a fifth aspect there is disclosed a chaff feed stream conditioning system for use with a crop residue separation system that separates crop residue into a flow of straw and a flow of chaff material where the flow of straw is located vertically above the flow of chaff material and the flow of straw material includes a flow path in free space above the flow of chaff and toward a straw spreader, the chaff feed stream conditioning system comprising,

- a separation mechanism interposed between the flow of straw and the flow of chaff material wherein the separation mechanism is configured to impede straw in the flow path in free space from falling into the flow of chaff material; and
- an air flow system capable of facilitating a flow of air: (a) through the separation mechanism; or (b) that bypasses the separation mechanism; or (c) having a first portion that flows through the separation mechanism and a second portion that bypasses the separation mechanism; or (d) both above and below the separation mechanism.

In a sixth aspect there is disclosed a chaff feed stream conditioning system for installation in a combine having crop residue handling system that operates to separate crop residue into a straw feed stream and a chaff feed stream which may include weed seeds where the straw feed stream directed to flow towards a straw spreader or chopper and a chaff feed stream directed to flow toward a mechanical devitalisation system, the feed stream conditioning system comprising: one or more magnetic trays located at one more points along and/or upstream of crop residue handling system to capture at least some metallic matter entrained in the straw feed stream and thereby at least reduce the amount of metallic matter that may otherwise enter the chaff feed stream or flow into one or both of the straw spreader/chopper and the mechanical devitalisation system.

In one embodiment chaff feed stream conditioning system comprises a baffle movable between: a first position in which the baffle directs the chaff feed stream into the mechanical devitalisation system, and the straw feed stream into the straw spreader or chopper; and a second position in which the baffle directs the chaff feed stream to bypass the mechanical devitalisation system and flow into the straw spreader or chopper.

In one embodiment chaff feed stream conditioning system comprises a separation mechanism located between the straw feed stream and the chaff feed stream, the separation mechanism configured to impede material from the straw feed stream from entering the chaff feed stream.

In one embodiment the chaff feed stream conditioning system comprises an air flow system capable of facilitating a flow of air: (a) through the separation mechanism; or (b) that bypasses the separation mechanism; or (c) having a first portion that flows through the separation mechanism and a second portion that bypasses the separation mechanism; or (d) both above and below the separation mechanism.

In a seventh aspect there is disclosed combine harvester comprising the chaff feed stream conditioning system according to any one of the first to fifth aspects.

BRIEF DESCRIPTION OF THE DRAWINGS

Notwithstanding any other forms which may fall within the scope of the impact mill as set forth in the Summary, specific embodiments will now be described, by way of example only, with reference to the covering drawings in which.

DETAILED DESCRIPTION OF SPECIFIC EMBODIMENTS

Figure 1:
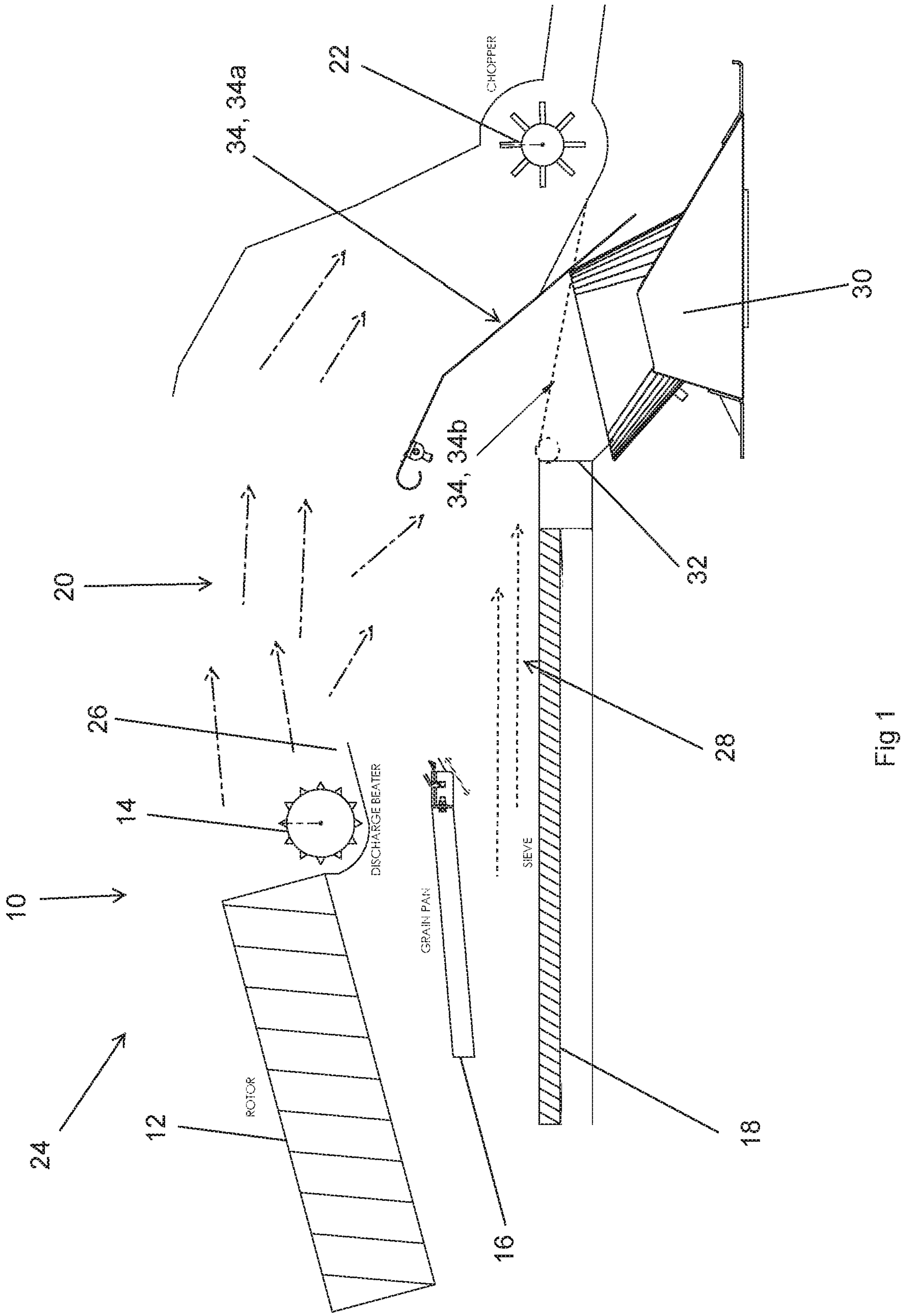
FIG. 1 is a schematic representation of a crop residue separation system of a combine harvester.

FIG. 1 shows a crop residue separation system 10 of a combine harvester, the residue being a combination of straw, chaff, weeds, weed seeds, volunteer seeds. The residue system 10 of the combine commonly separates the residue into a stream or flow of straw; and, a stream or flow of chaff which includes the weeds, weed seeds, volunteer seeds.

The residue separation system 10 includes a rotor 12 and discharge beater 14 and a sieve 18. An optional grain pan 16 is also shown between the rotor 12 and sieve 18. (Some combine manufacturers do not include a grain pan; in any event a grain pan is not important to embodiments of the disclosed system.) The rotor 12 and discharge beater 14 act to separate the target crop from the straw and chaff. Any grain reaching the beater 14 drops onto the grain pan 16, when provided (otherwise it will fall onto the sieve). The grain pan is inclined in the direction of chaff flow 28 and oscillates to move the grain in a forward direction toward the front section of the sieve. Straw is thrown by the discharge beater 14 to form a flow of straw (i.e. a straw feed stream) 20 toward a straw chopper 22 or straw spreader, or straight out the back of the combine harvester to simply windrow the straw.

The combination of the rotor 12 and at least the discharge beater 14 form part of a straw handling mechanism 24. The straw handling mechanism system has an upstream end 26.

The sieve 18 is located below the straw handling mechanism 24. The sieve 18 acts to progress the flow of chaff (i.e. the chaff feed stream) 28 from the harvested crop toward a back end of the harvester. The sieve 18 is formed with a plurality of openings to allow air to flow upwardly through the sieve 18. The air flow and the balancing of the air flow is material to the performance and efficiency of the sieve 18. In this embodiment, though not necessarily in all embodiments, the chaff stream 28 is directed toward a mechanical devitalisation system 30 such as a mill. The sieve 18 forms part of a chaff handling mechanism and has a downstream end 32 which is downstream of the upstream end 26 of the straw handling mechanism 24.

The crop residue system of the combine harvester is also shown with a simple movable baffle 34. The baffle 34 is a movable between: a first position 34*a* shown by the solid line in FIG. 1 which acts to prevent the chaff from mixing with the straw flow 20 and entering the chopped 22; and a second position 34*b* shown by the phantom line which directs the chaff to mix with the flow of straw 20 in the chopper 22. Alternate baffle or feed stream channelling/directing mechanisms are possible however these are not significant to conditioning of the chaff feed stream 28.

The straw flow 20 includes a flow path in free space. This path extends from the upstream end 26 to the baffle 34 irrespective of its baffle position. A portion of the straw in the free space flow path may fall into the flow of chaff 28. The straw feed stream may contain foreign bodies picked up by a header on a combine and entrained in the material flow through the rotors 12 to the beater 14. In addition, components from within the combine can come loose and become a foreign body. The foreign bodies may include stone, twigs, metallic articles or material such as wire, nails, nuts, screws, and bolts.

Figure 2:
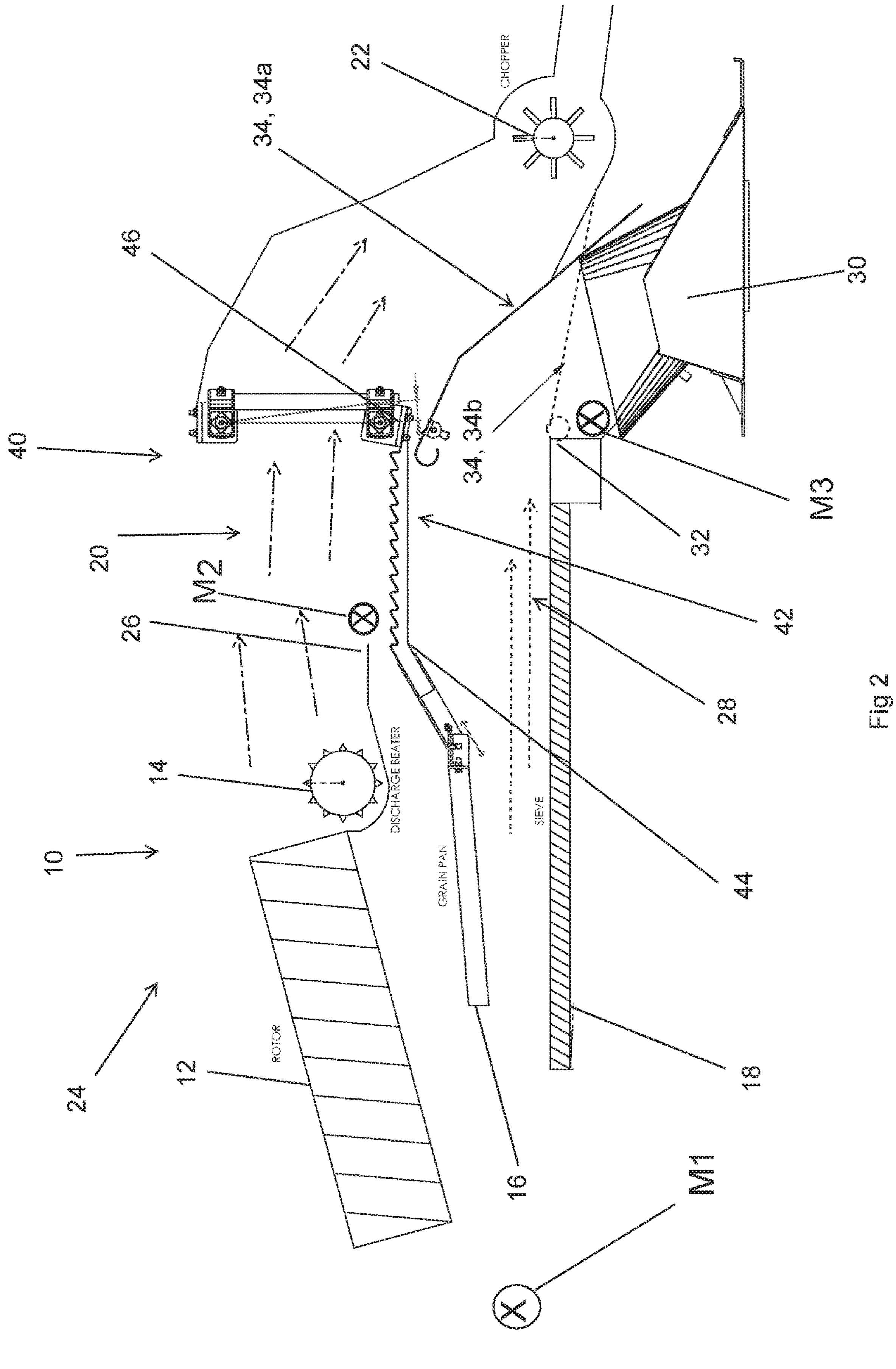
FIG. 2 is a schematic representation of an embodiment of the disclosed chaff feed stream conditioning system installed in and forming part of the crop residue separation system shown in FIG. 1.
Figure 4:
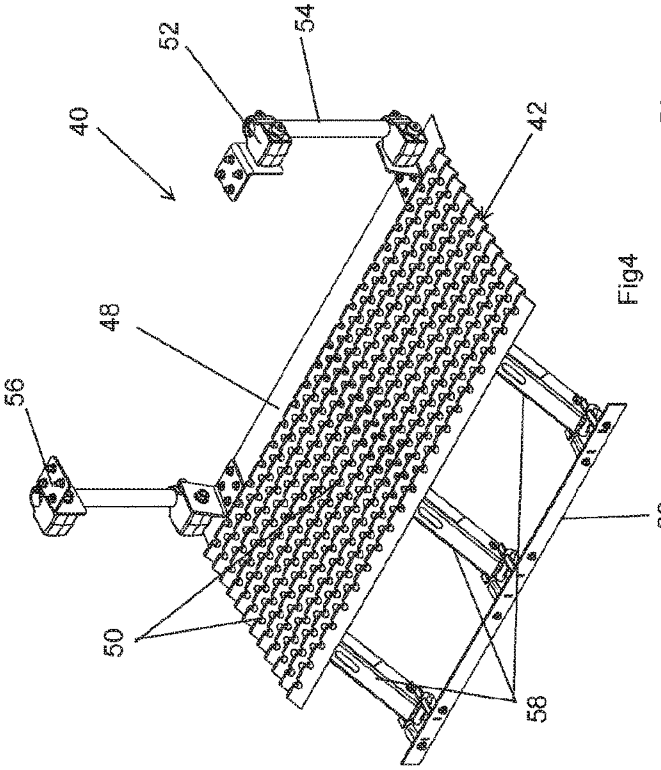
FIG. 4 is a perspective view of the chaff feed stream conditioning system shown in FIGS. 2 and 3.
Figure 6:
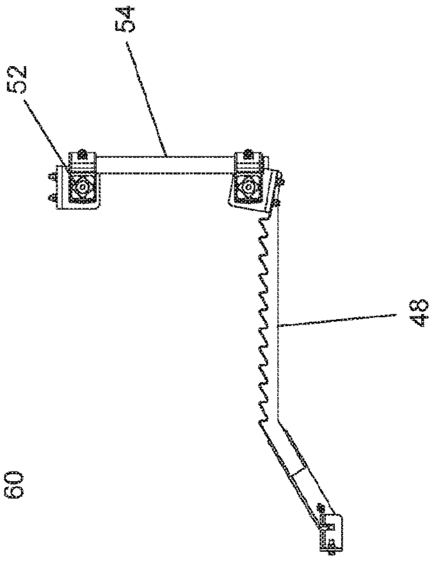
FIG. 6 is a side view of the chaff feed stream conditioning system shown in FIGS. 2-5.
Figure 3:
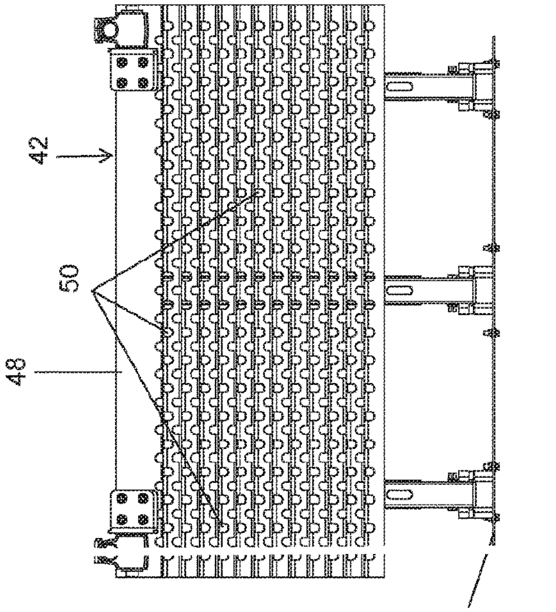
FIG. 3 is a plan view of the chaff feed stream conditioning system shown in FIG. 2.
Figure 5:
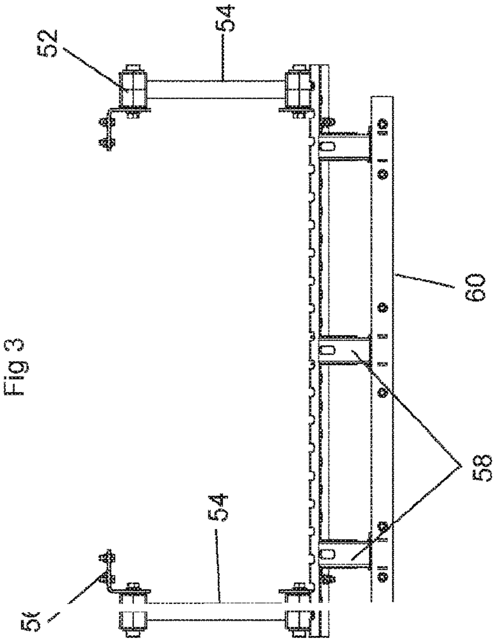
FIG. 5 is an end view of the chaff feed stream conditioning system shown in FIGS. 2-4.

FIG. 2 shows the substantive componentry of one embodiment of the disclosed chaff feed stream conditioning system 40 in conjunction with a combine separation system 10. The conditioning system 40 may be a distributed system having one or more components or devices distributed from downstream of crop residue system through to an upstream end of the chaff feed stream 28. Some parts of the chaff feed stream conditioning system 40 may be interposed, or otherwise acts, between the flow of straw 20 and the flow of chaff material 28. The chaff feed stream conditioning system 40 acts to optimise the quality or purity of the chaff stream 28 prior to downstream processing. In the context of the combine this processing may be mechanical devitalisation by the system 30 or mixing with straw in the chopper 22, or simply windrowing. The chaff feed stream conditioning system 40 is configured to impede (i.e. reduce the likelihood of) straw or other foreign matter such as but not limited to stones and metallic articles e.g. nails, screws, nuts, wire in the straw flow path 20 or elsewhere from getting into the flow of chaff feed stream 28, or more particular reaching an upstream end of the chaff feed stream.

In the embodiment of the chaff feed stream conditioning system 40 in FIG. 2 the one or more components or devices may include either individually or in combination (a) a separation mechanism 42 that is disposed between the straw and chaff feed streams 20, 28 respectively; and (b) one or more magnets disposed along the residue stream. Indeed, in another variation described latter the separator mechanism may itself incorporate one or magnets or be magnetisable. In that case in embodiment where magnets are used they by be provided by the separator mechanism rather than as stand-alone magnets.

The magnets may be installed in one or more magnetic tray across the one or both straw and chaff streams. For example, with reference to FIG. 2 three magnetic trays M1, M2, M3 are disposed along the residue steam. These comprise:

- a magnetic tray M1 in a feeder house upstream of the rotor 18 or the crop residue handling system 10 to capture magnetic material before it reaches the rotor, beater 14 or the sieve 18;
- a magnetic tray M2 at the upstream end 26 of the straw handling mechanism 24; and,
- a magnetic tray M3 between the sieve 18 and the mechanical devitalisation system 30.

In an embodiment of the system 40 which includes the magnetic tray M1 the system 40 has componentry upstream of the combine residue separation system 10, rather than disposed between the straw and the chaff feed streams 20 and 28 respectively.

When the system 40 includes one or more magnets either presented as trays Mi or otherwise, but not the separator mechanism 42, the conditioning of the chaff feed stream 28 is by way of minimising the number of metallic articles in the straw stream 20, which therefore cannot fall into the chaff stream 28. (This has the added benefit of minimising the amount of metallic material entering the chopper 22, thereby reducing the risk of damage.) When the feed stream conditioning system 40 has a separation mechanism 42 but not any magnets, the conditioning of the chaff feed stream 28 is by way of minimising material from the straw stream 20 falling into the chaff stream 28. When the feed stream conditioning system 40 uses both a separation mechanism 42 and one or more of the magnetic trays Mi maximum conditioning or optimisation of the chaff feed stream 28 may be provided.

The magnetic trays Mi (where i=1, 2, 3, . . . , etc) may extend for the full width of the corresponding material flow paths. The trays may have a single row or multiple rows of magnets. Also, the trays may be arranged so that their surface presented to the material stream is inclined in the downstream direction of material flow. If two or more magnetic trays are used to extract magnetic material from a material stream the trays may be arranged as two or more magnetic trays which are spaced apart in a vertical direction, they may also be separated or spaced apart in the downstream direction. Rare earth magnets may be used in the magnetic trays for producing the magnetic field for attracting magnetic bodies in the material flow. Alternately electromagnets may be used. This may allow control of the magnetic field and filed strength.

The chaff feed stream conditioning system 40 may comprise an air flow system, or is otherwise designed or configured, for maintaining air flow through the sieve 18 and air flow balance within the immediate region of sieve. This may include facilitating a flow of air: (a) through the separation mechanism; or (b) that bypasses the separation mechanism; or (c) having a first portion that flows through the separation mechanism and a second portion that bypasses the separation mechanism; or (d) both above and below the separation mechanism.

In its simplest form the air flow system enables air to flow through the separation mechanism 42, in a direction from below to above the separation mechanism 42; and, advance the straw that falls onto it toward the straw chopper 22 and/or an associated straw spreader.

When the system 40 includes the separator 42, the system 40 acts as a physical barrier between the free space flow path of the straw 20 and the flow of chaff material 28 so that straw or other foreign that may otherwise fall into the chaff flow/feed stream 28 instead lands on, is captured by, or redirected back to the straw feed stream 20, by the chaff feed stream conditioning system 40.

In this embodiment the separation mechanism 42 has an upstream end 44 that is upstream of the upstream end 26 of the straw handling mechanism 24. A downstream end 46 of the separation system 42 is downstream of the chaff handling system 18. That is, the separation mechanism 42 extends over and beyond the downstream end 32 of the chaff handling mechanism 18. This is irrespective of the baffle 34 being in position 34*a* or 34*b*. The separation mechanism 42 assists in conditioning of the chaff stream 28 by mechanically blocking straw or other foreign material contained in the straw stream 20 from falling into the chaff stream 28.

With reference to FIGS. 3-6 this embodiment of the separation mechanism 42 comprises a support structure 48 in the form of a platform. The platform 48 has a plurality of holes 50 that form, least in part, the air flow system allowing the air to flow through the mechanism 42/platform 48. Having a flow of air through, (or as described later, about or bypassing) the chaff feed stream conditioning system 40 assists in handling the substantial volume of air is generated by the separation system 10 for cleaning the sieve 18.

The separator mechanism 42, in this and every other embodiment, may also itself comprise magnetic components or be magnetised or magnetisable. For example, the platform 48 may be made from a magnetic material, or have magnets embedded in it, or be selectively magnetisable by the control of an electric current through one or more coils (not shown) extending around parts of the platform 48. Therefore, in another example one or more of the magnets or magnetic trays Mi may be incorporated in or on, or otherwise supported by the platform 48/separator mechanism 42.

The air flow system can be arranged, or provided with a separate control system, to vary or control the flow of air through the chaff feed stream conditioning system 40. In one example this may be done by forming the platform 48 with parallel plates each provided with holes that can be moved relative to each other between one position where the holes are in full registration with each other to provide maximum airflow, to a second position where the degree of registration reduced (for example to 50% or even 0% if a vent or other mechanism is provided to channel air out of the combine, as discussed later).

The chaff feed stream conditioning system 40 may be arranged to impart motion or kinetic energy to the straw falling on the platform 48. The purpose of this is to advance the straw toward the chopper 22 and/or associated straw spreader. This can be achieved by the use of motors 52 to shake or vibrate the platform 48. If the platform 48 is declined in a downstream direction (which is not represented in the current drawings) this motion together with the action of gravity will move the straw toward the chopper 22.

In the embodiment shown in FIGS. 2-6 the upper surface of the platform 48 has a sawtooth like profile. The profile is arranged so that the shake or vibration of the mechanism 42/platform 48 advances the straw toward the chopper 22 or associated straw spreader. This effect can be achieved with the platform 48 in a substantially horizontal plane or declined from its upstream end to its downstream end, or indeed even inclined upwardly to a critical angle similar to a straw walker.

The chaff feed stream conditioning system 40 may be provided with a control system that independently controls: the aeration/air flow system; and, the motors 52. In this way a user can independently control the air flow through the combine separation system 10 including the sieve 18 as well as the degree of motion or kinetic energy imparted to the straw falling on the separation mechanism 42/platform 48.

Spaced apart arms 54 support respective sides of the platform 48. Upper ends of the arms 54 are coupled with the motors 52. The motors 52 are in turn attached to brackets 56 that are used to attach the platform 48 to an internal structure, surface, or component of the harvester.

A plurality of arms 58 connect opposite side of the platform 48 to a bracket 60. The bracket 60 may be attached either directly or via other mechanical linkages to an internal surface of the combine or a component of the combine separation system 10. In the illustrated embodiment which shows the optional grain pan 16, the bracket 60 is attached to the gain pan 16. Given that the grain pan 16 in a combine separation system 10 is normally vibrated or reciprocated, the motors 52 may be dispensed with and replaced with pivot or resilient couplings to the brackets 56 so that the motion of the grain pan is imparted to the platform. In that event the degree of motion of the platform 48 will be controlled by the grain pan 16. In yet another embodiment the platform 48 may be formed as a part of the grain pan 16 when the grain pan 16 is provided in the combine.

In another variation, for example when the grain pan 16 is not provided, the separation mechanism 42 and in particular the platform 48 may be an integral part of the sieve assembly 18. Alternatively, the separation mechanism 42 could be coupled to and supported by a plurality of struts or mechanical links coupled to the sieve 18, holding the platform 48 in substantially the same location as shown in FIG. 2. In such variations the motors 52, arms 54 and brackets 56 may not be required. The support and agitation of the platform 48 may be provided by virtue of is integration with or coupling to the sieve whose vibratory or oscillating motion is imparted to the platform 48.

Now that an embodiment of the disclosed chaff feed stream conditioning system 40 has been described those skilled in the art will recognise the possibility of routine engineering modifications and variations. These include for example, and as intimated the above, forming the platform 48 with a planar surface rather than one with a sawtooth profile. In another variation the platform 48 may be formed from the very same structure as the sieve 18.

Figure 7:
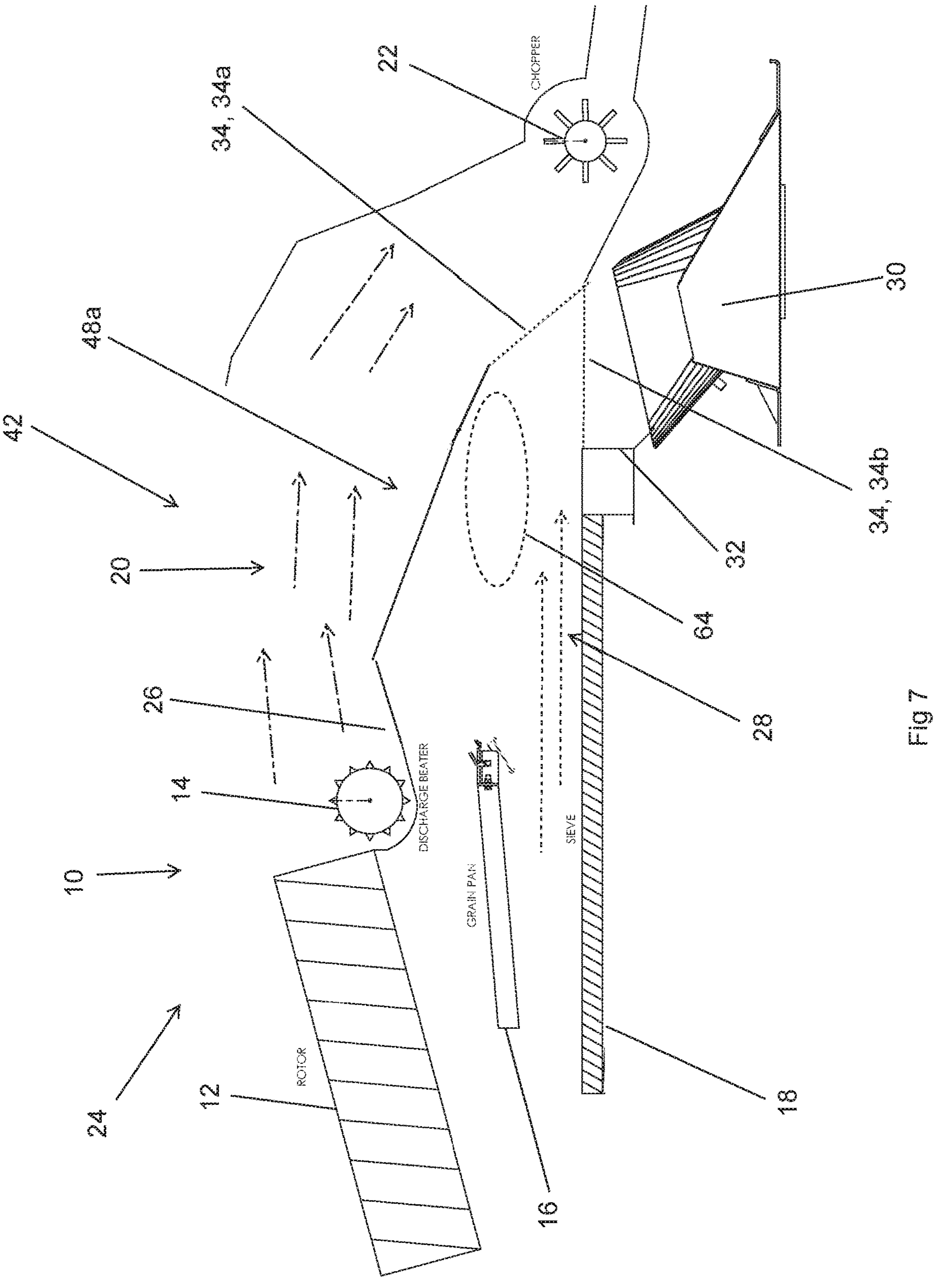
FIG. 7 is a schematic representation of a second embodiment of the disclosed chaff feed stream conditioning system.

FIG. 7 shows a further embodiment of the disclosed chaff feed stream conditioning system 40 in which the separation mechanism 42 is in the form of a platform 48*a* provides a continuous surface from the downstream end of the straw handling mechanism 28 to the chopper 22 and/or associated straw spreader. A shaker, vibrator or other device can be provided to act on the platform 48*a* to induce motion to the straw landing on it to assist in progressing the straw toward the chopper 22 and/or straw spreader. An alternate would be a flexible element such as a shaking rubber floor that assists the motion of material over the rigid platform.

In this embodiment the air flow system can take various forms. In one form the air flow system comprises a plurality of holes formed in the platform 48*a* similar to the holes 50 preview described in relation to the platform 48. These holes can be made of a variable size to enable control of air flow through the separation mechanism 42.

In all embodiments the air flow system of the system 40 may also comprise one or more vents 64 that enables air that is flowing through the chaff handling mechanism and in particular the sieve 18 to bypass the platform 48*a*. The air passing through the vents 64 is vented to the outside of the combine harvester. In the application of weed seed capture, these vents may be designed to prevent the loss of weed seeds. One possibility would have a plenum chamber, cyclone or alternative separation system which is fed by the air stream and entrained material flowing out of the vents. To be clear the chaff feed stream conditioning system 40 may include vents 64 irrespective of the form or even the provision of a separation mechanism 42/platform 48 for the purposes of managing air flow and balance through the sieve 18.

Figure 8:
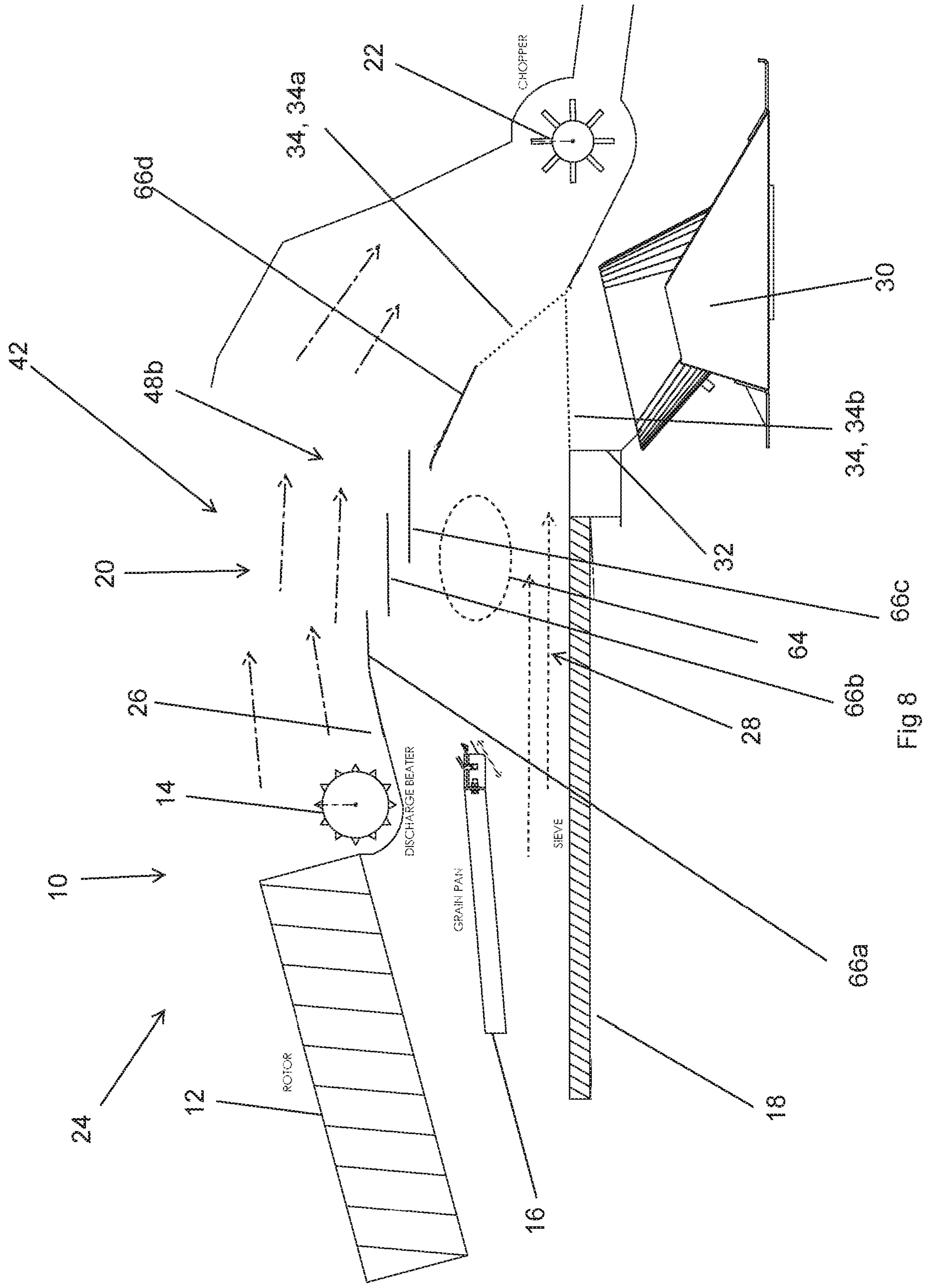
FIG. 8 is a schematic representation of a third embodiment of the disclosed chaff feed stream conditioning system.

FIG. 8 shows yet a further embodiment of the disclosed chaff feed stream conditioning system 40 in which the separation mechanism 42 is in the form of a louver structure 48*b* having at least two or more overlapping and spaced apart surfaces 66*a*, 66*b*, 66*c* and 66*d* (collectively referred to as "the louver surfaces 66"). The spaces between the louvre surfaces 66, form the air flow system which enables air to flow through the separation mechanism 42. An optional vent 64 is also shown.

Figure 9:
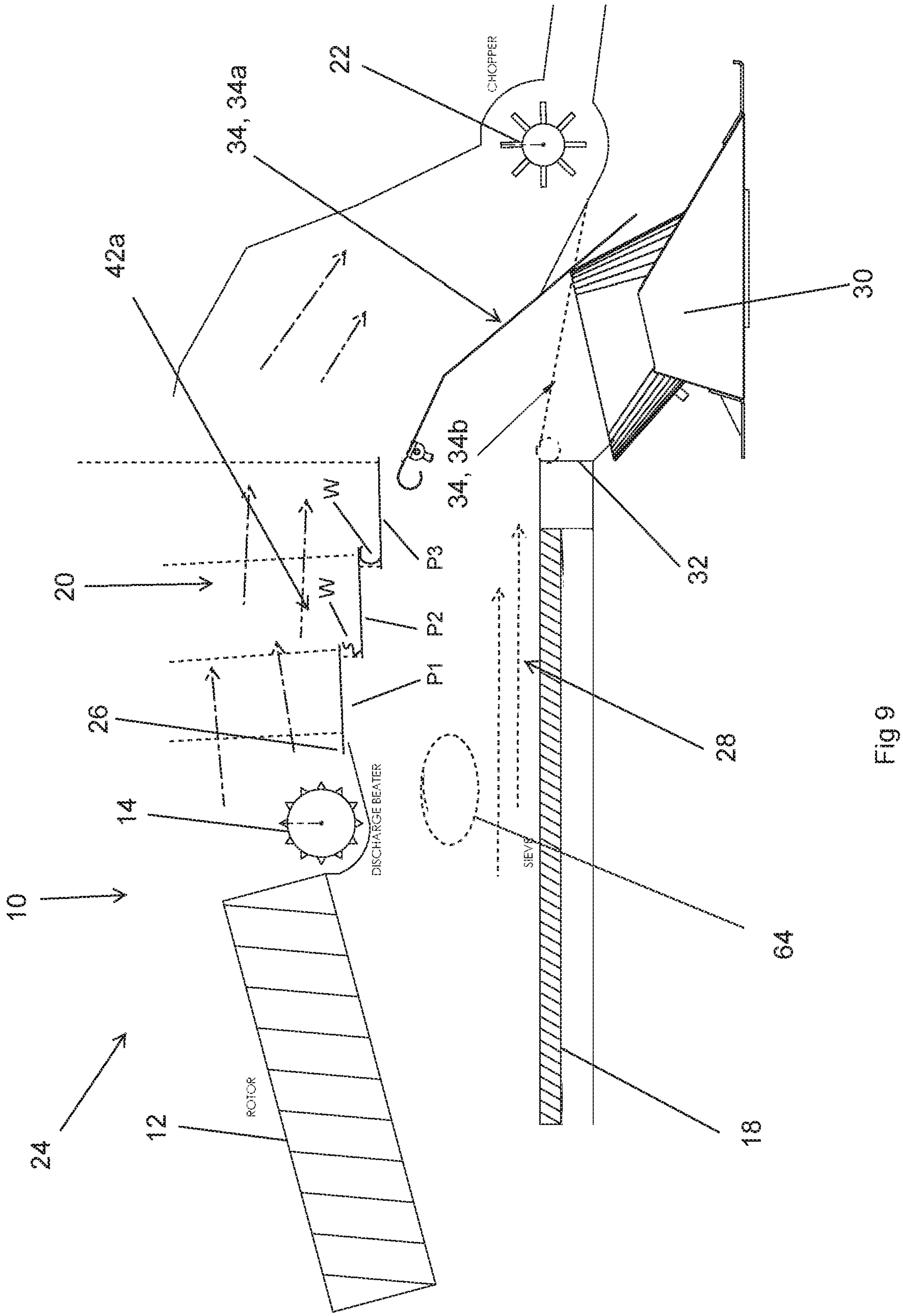
FIG. 9 is a schematic representation of a fourth embodiment of the disclosed chaff feed stream conditioning system

FIG. 9 shows an embodiment of the chaff feed stream conditioning system 40 comprising a separation mechanism 42*a* being in the form of one or more (in this case three) plastic sheets/platforms P1-P3. The platforms extend between the straw and chaff flow is 20, 28 from the upstream end 26 of the straw handling mechanism, which coincides with and is thus the same as, an upstream end of the straw feed stream, to or beyond the upstream end of the baffle 34 when in the first position 34*a*. The plastic sheets/platforms P1-P3 may be formed with a plurality of holes to allow air to flow through them.

Also, the sheets/platforms P1-P3 may be supported by non-rigid (i.e. flexible, pliable or articulated) elements such as cables or chains to induce movement of the straw landing thereon towards the chopper 22. The movement of the sheets(s) and thus the straw material may be a result of: (a) natural vibrations in the combine; (b) vibrations due to the combine driving across the land; and/or (c) the effect of air flow through the chaff feed stream conditioning system 40 and in particular holes in the sheet(s). In this embodiment three overlapping sheets/platforms P1-P3 are shown although the number can vary from one or two to three or more. Also, if desired a flexible web of material W may be coupled between the sheets/platforms P1-P3 to prevent the flow of straw between adjacent platforms P1-P3 into the chaff stream 28.

Irrespective of whether or not the platforms are provided with holes to allow the passage of air a vent 64 also be provided to assist in balancing airflow through the sieve 18. Also, in this embodiment will be seen that the crop residue handling system tends not include the grain pan 16, which as previously mentioned is immaterial to embodiments of the disclosed system 40.

Figure 10:
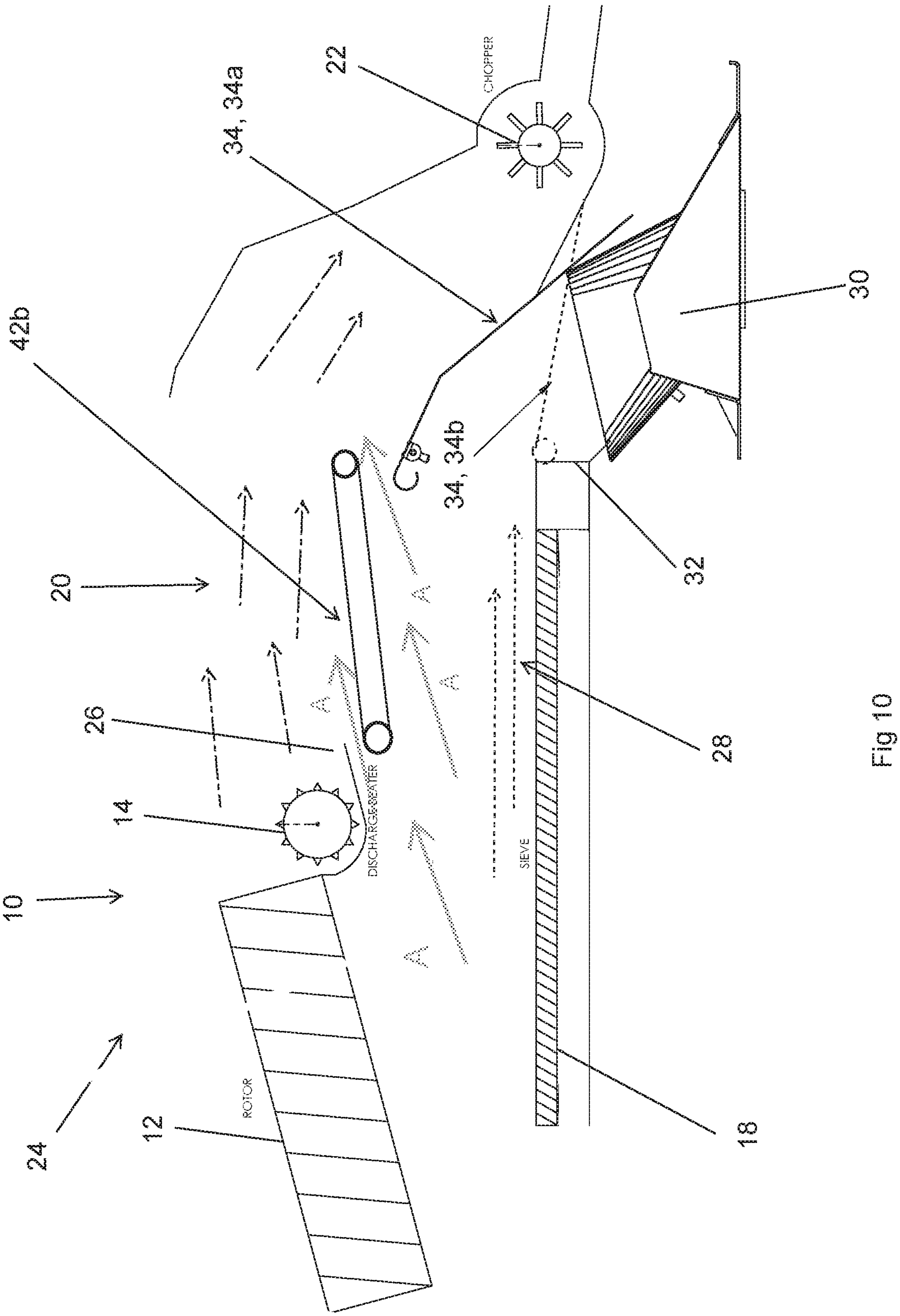
FIG. 10 is a schematic representation of a fifth embodiment of the disclosed chaff feed stream conditioning system.

FIG. 10 shows embodiment of the chaff feed stream conditioning system 40 in which the separation mechanism 42*b* is in the form of a conveyor. The conveyor 42*b* lies in between the straw and chaff flows 20, 28 from a location downstream of the upstream end 26 of the straw handling mechanism (and thus the upstream end of the straw feed stream 20), to or beyond an upstream end of the baffle 34 when in the first position 34*a*. The conveyor 42*b* acts to transport to the chopper 22, straw in the flow 20 that may otherwise fall short of the baffle 34 and thus mix with the chaff stream 28. In this embodiment, the conveyor 42*b* rotates in the clockwise direction to assist in transporting the straw in the flow 20 to the chopper 22. Due to this motion of the conveyor 42*b* no other motion needs to be imparted to the straw falling on the conveyor 42*b* to move it toward the chopper 22. Therefore, the conveyor may be a solid belt and positioned to allow air flow to travel above and below the conveyor as shown by arrows A in FIG. 10. Nevertheless, in an alternate form, to assist in air flow the conveyor 42*b* may be made from a mesh material having a plurality of holes to allow the flow through of air. Additionally, or alternately the vents 64 described previously in relation to the embodiment shown in FIG. 7 can also be incorporated into this or indeed any of the embodiments described herein.

In each of the embodiments shown in FIGS. 7 and 8, an optional baffle 34 can be incorporated into a portion of the chute which guides straw toward the feeding the chopper 22 and/or straw chopper. The baffle 34 is movable between a first position 34*a* which prevents the chaff stream 28 from entering the short straw chopper 22 and/or associated straw spreader (i.e. prevents a mixing of the straw and chaff streams); and the second position 34*b* which guides the chaff stream 28 into the chopper 22/straw spreader. In the embodiment shown in FIG. 7 the baffle 34 is part of the platform 48*a*, whereas in the embodiment shown FIG. 8 the baffle 34 would be contiguous with the surface 66*d* when the baffle 34 is in the position 34*a*.

In the event that the baffle 34 is not provided in these embodiments then the platform 48*a* of the embodiment in FIG. 7 and the surface 66*d* in the embodiment shown in FIG. 8 would each extend along the phantom line 34*a* in these Figures and there would not be a baffle 34 in the position 34*b* so that the chaff will fall directly into the device 30 (assuming such a device is provided).

In yet another variation or modification that may be applied to all embodiments an air blast system (not shown) can be installed to blast air across the top of the platform 48 to keep it clean and material moving, either instead of or in addition to shaking or vibrating the platform 48. This can be achieved by installation of a fan or blower. Introducing additional air in this area may serve to upset the airflow of the sieve. Therefore, an optional electronic solution would be to balance the airflow through this portion of the combine so that the air blast does not upset the sieve 18.

Embodiments of the disclosed chaff feed stream conditioning system 40 or a combine or other agricultural machine incorporating the disclosed chaff feed stream conditioning system 40 may include any one or more of:

1. one or more blockage sensors arranged detect blockage in or reduced mass flow rate of material through or in one or any combination of:
    a. straw stream 20 b. chaff stream 28
c. chopper 22
d. mechanical seed devitalisation system 30
e. along the separation mechanism 42, 42*a*, 42*b*, 2. one or more vibration sensors arranged to sense vibration arising from rotation of the chopper 22 or the mechanical seed devitalisation system 30;
3. temperature sensors to the temperature of bearing associated with the rotating components of the chopper 22 and the mechanical seed devitalisation system 30;
4. one or more proximity sensors to provide or cause the generation of an alarm when a person is within a designated distance of the chopper 22 or mechanical seed devitalisation system 30. Such sensors may also be arranged to directly or indirectly activate a light and/or an audible signal generator to indicate or otherwise show that the chopper 22 or system 30 is still rotating thereby alert the person that machine is not safe to work on;
5. air pressure sensors at various locations in or around the chaff feed stream conditioning system 40, this may include, but is not limited to, one or more sensors for the purposes of the air blast system mentioned above;
6. air flow sensors for sensing air flow through various components of the chaff feed stream conditioning system 40 such as the separator mechanism 42/platform 48 and its variants described herein;
7. vibration/motion sensors for sensing the motion of the separator mechanism 42/platform 48 and its variants described herein;
8. one or more torque sensors arranged to provide a signal indicative of torque or load applied to a drive shaft of the impact mechanism 16.

These sensors may feed their output signals/data to a data processor associated with the chaff feed stream conditioning system 40 or a combine or other agricultural machine incorporating the disclosed chaff feed stream conditioning system 40. A communication system may also be provided with the system 40 or a combine or other agricultural machine incorporating the disclosed system 40. The communications system or data processor may also include a GPS.

The provision of data processing and communication systems enables data, signals or information from any one or more of the sensors to be communicated via a communications network including but not limited to the Internet or the Internet of things, to a remote location or of course to the control cab of the combine. The data, signals or information from the sensors may be provided directly from the sensors, or, as processed data, signals or information subsequent to processing by the data processor, or both.

Communicating the data, signals or information enables remote monitoring of the performance of the system 40 and its component parts as well as the combine harvester.

The remote monitoring can for example enable manual or automated communication to a combine operator or a service department of performance characteristics of the system 40 and/or the combine harvester. The performance characteristics may include: information regarding wear of various components, the need for maintenance, or the provision in real time of alerts or alarms to the combine operator of potentially dangerous performance characteristics such as bearing temperature.

The data, signals or information may also be used, together with other operational information communicated via the communication system such as forward speed of the combine harvester and GPS data, to calculate the amount of material processed by the system 40/associated combine harvester including geographically tagging the data. This may be beneficial in terms of different business or revenue models for commercialisation of the system 40 and/or combine harvester in enabling for example lease payments/charges being made on the basis of the calculated amount of material processed by the combine harvester.

The data, signals or information from the sensors and processed can be used in real time or otherwise to:

to alert the combine harvester of various operational characteristics of the system 40 (to a component/subsystem level) and/or the harvester;
signal the need for maintenance and/or repair;
determine performance characteristics of the system 40 and/or the combine harvester;
enable calculation of throughput of material processed by the system 40 and/or the combine harvester.

The data, signals and information communicated to the remote location may be stored locally or on a cloud-based system. In any event the data, signals and information may be fed to a machine learning/artificial intelligence system. This in turn may be arranged for example to: forecast expected lifespan of components, system 40 throughput; and/or suggest potential adjustments to system or combine harvester parameters to improve operational efficiency.

The sensors may be operatively coupled to the data processor which can be programmed to take one or more specific actions if a blockage or an anomalous change in material flow is detected. These actions may include but are not limited to: operating a high-pressure air compressor to direct one of jets of air to a location where the change in material flow or blockage is detected; and/or reducing the ground speed of the system 40 or combine to reduce the volume of material being directed to the blockage site. In the latter case the data processor may alert an operator if and when that the blockage has cleared to enable a resumption of normal travel speed.

Embodiments of the disclosed chaff feed stream conditioning system may provide one or more of the following benefits and advantages:

decrease the risk of ingress of foreign objects into the chaff stream and thus any downstream processing system such as a mechanical seed devitalisation system, or collection bin/pile;
preventing green material that exits the rotor through the beater from entering the chaff stream, and thus any downstream mechanical seed devitalisation system, or collection bin/pile/windrow;
assist in capturing more seeds-chance of seeds impacting the shaking tray and dropping into mill;
assist in capturing more chaff-less chaff into the straw stream;
modelling the patches of weeds in a field; and
optimising the level of mechanical control of weed seeds in the field.

Any discussion of the background art throughout this specification should in no way be considered as an admission that such background art is prior art, nor that such background.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the apparatus and method as disclosed herein.

What is claimed is:

1. A chaff feed stream conditioning system configured for installation in a combine having: (a) a crop residue handling system including a discharge beater and a sieve; (b) a straw spreader or chopper; (c) a mechanical devitalisation system; and (d) a baffle; where the crop residue handling system operates to separate crop residue into a straw feed stream and a chaff feed stream which may include weed seeds, where the discharge beater has a downstream end from which the straw feed stream is directed to flow in a downstream direction towards the straw spreader or chopper and the chaff feed stream is directed to flow along the sieve toward the mechanical devitalisation system, the baffle being movable between a first position in which the baffle directs the chaff feed stream into the mechanical devitalisation system and the straw feed stream into the straw spreader or chopper; and a second position in which the baffle directs the chaff feed stream to bypass the mechanical devitalisation system or other processor and flow into the straw spreader or chopper, the chaff feed stream conditioning system comprising:

a separation mechanism configured to act as a physical barrier between the straw feed stream and the chaff feed stream so that straw or other foreign material that may otherwise fall into the chaff feed stream lands on, is captured by, or redirected back to the straw feed stream, the separation mechanism being a platform having a continuous surface sloping downwardly in the downstream direction, wherein the platform extends between the straw feed stream and the chaff feed stream, from the downstream end of the discharge beater and an upstream end of the straw feed stream to or beyond an upstream end of the baffle when the baffle is in the first position; and a first magnetic tray located between the sieve and the mechanical devitalisation system to capture at least some metallic matter entrained in the crop residue and thereby reduce an amount of metallic matter in at least the chaff feed stream reaching a downstream end of the chaff feed stream.

2. A combine having a crop residue handling system that includes a discharge beater, a sieve, a baffle, a straw spreader or chopper and a mechanical devitalisation system, wherein the crop residue handling system creates a residue stream that is divided into a straw feed stream and a chaff feed stream which may include weed seeds, where the straw feed stream is directed to flow by the discharge beater in a flow path towards the straw spreader or chopper or be windrowed, and the chaff feed stream flows below the straw feed stream and along the sieve toward the mechanical devitalisation system, the baffle being movable between: a first position in which the baffle directs the chaff feed stream into the mechanical devitalisation system and the straw feed stream into the straw spreader or chopper; and a second position in which the baffle directs the chaff feed stream to bypass the mechanical devitalisation system and flow into the straw spreader or chopper, the combine having a chaff feed stream conditioning system according to claim 1 wherein the sieve is located below the platform.

3. The chaff feed stream conditioning system according to claim 1 wherein the platform comprises a single continuous planar surface.

4. The chaff feed stream conditioning system according to claim 3 wherein the first magnetic tray extends for a full width of the sieve.

5. The chaff feed stream conditioning system according to claim 3 wherein the first magnetic tray extends for a full width of the sieve and has a surface presented to the chaff feed stream that is inclined in the downstream direction of flow of the chaff feed stream.

6. The chaff feed stream conditioning system according to claim 3 comprising a second magnetic tray that extends across the straw feed stream between the platform and the straw feed stream.

7. The chaff feed stream conditioning system according to claim 1 wherein the first magnetic tray extends for a full width of the sieve.

8. The chaff feed stream conditioning system according to claim 1 wherein the first magnetic tray extends for a full width of the sieve and has a surface presented to the chaff feed stream that is inclined in the downstream direction of flow of the chaff feed stream.

9. The chaff feed stream conditioning system according to claim 1 comprising a second magnetic tray that extends across the straw feed stream between the platform and the straw feed stream.

10. The chaff feed stream conditioning system according to claim 9 comprising a third magnetic tray located upstream of the crop residue handling system to capture magnetic material before it reaches the crop residue handling system.

* * * * *